No. 722,164. PATENTED MAR. 3, 1903.
F. P. STONE.
FASTENING DEVICE FOR VEHICLE TIRES.
APPLICATION FILED MAR. 27, 1902.
NO MODEL. 2 SHEETS—SHEET 1.
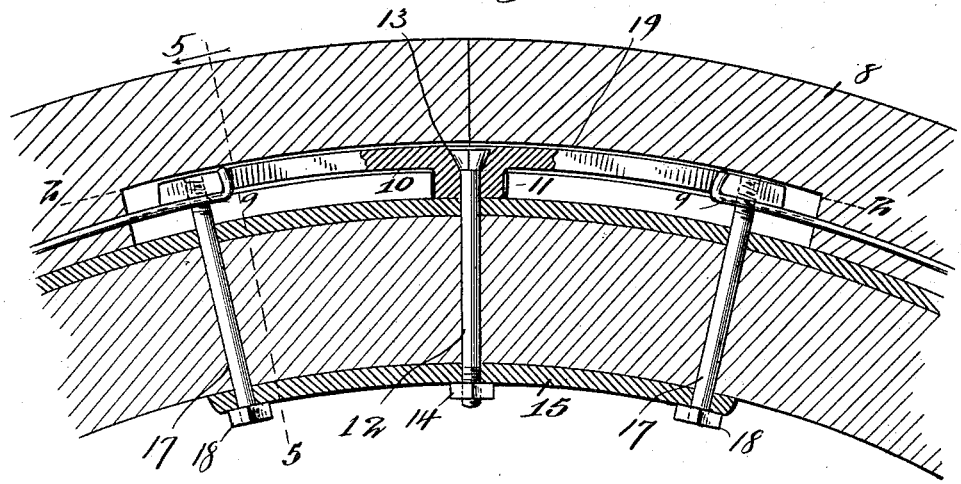
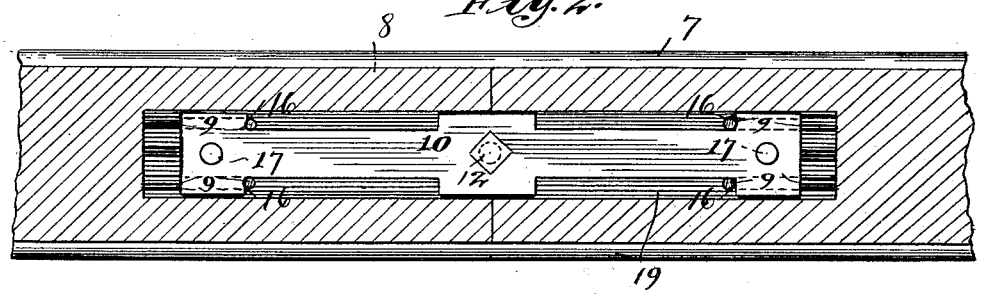
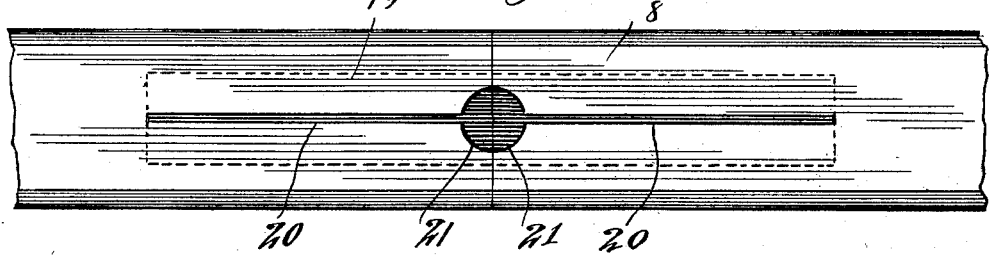
Witnesses: Inventor;
Frank P. Stone,
By Offield, Towle & Linthicum
Attys.

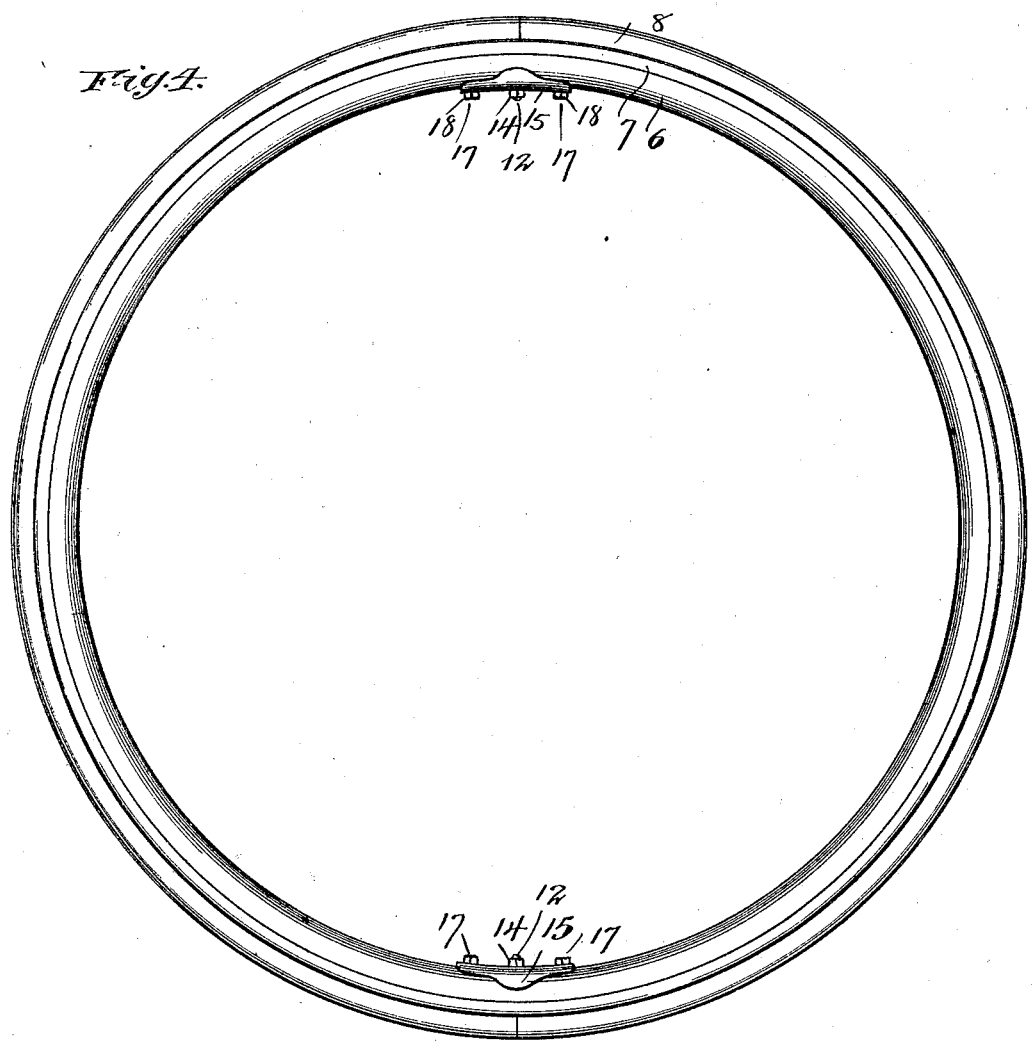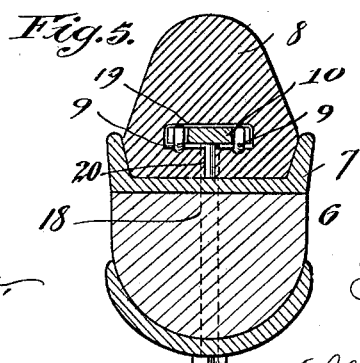

UNITED STATES PATENT OFFICE.

FRANK P. STONE, OF CHICAGO, ILLINOIS.

FASTENING DEVICE FOR VEHICLE-TIRES.

SPECIFICATION forming part of Letters Patent No. 722,164, dated March 3, 1903.

Application filed March 27, 1902. Serial No. 100,323. (No model.)

*To all whom it may concern:*

Be it known that I, FRANK P. STONE, a citizen of the United States, residing at Chicago, in the county of Cook and State of Illinois, have invented certain new and useful Improvements in Fastening Devices for Vehicle-Tires, of which the following is a specification.

My invention relates to vehicle-tires of that class in which a solid-rubber tire is secured and supported within a metal channel, itself mounted on the periphery of the usual wooden rim; and my invention has reference more particularly to an improved means for securing the rubber body of the tire in its containing-channel in a more efficient and durable manner than hitherto. One of the commonest devices now in use for this purpose comprises one or more wires which are embedded in the body of the rubber tire longitudinally and near the base thereof, which securing-wires, in the operation of applying the tire to the rim, usually have their meeting ends brazed or soldered together, thus making them endless. This construction provides no means whereby the retaining-wires are in any way connected to the channel or rim of the wheel, and it has been found in practice, especially in the case of automobile-wheels wherein the traction effect is applied to the wheel, that the alternate expansion and subsequent contraction of that portion or section of the rubber tire which is in contact with the ground produces a longitudinal creeping of the rubber tire in one direction within the rim and a similar creeping of the retaining-wires within the body of the tire in the opposite direction, and this creeping causes the wires to gradually cut through the base portion of the tire lying between the retaining-wires and the bottom of the channel.

The primary object of my invention is to provide a construction which shall prevent the creeping of both the tire-body in the channel and of the retaining-wires relatively to the tire-body by affording a positive and rigid connection of the retaining-wires to the channel and the rim of the wheel through an anchoring device, which at the same time prevents the longitudinal movement of the tire-body relatively to its containing-channel. It has also been found in practice that these fastening-wires are usually weaker at their point of union when secured in the manner above mentioned, and the moment a break occurs not only does the retaining effect of the wires cease, but the loose ends soon cause irreparable damage to the containing rubber body by piercing and perforating the same.

The primary object of my invention is to provide a simple and highly-efficient means for connecting the ends of the retaining-wires in such a manner as to entirely obviate the creeping of both the tire and the wires and also to dispense with the usual weak point at such connections by affording a positive anchoring of the wires to the rim and also providing a construction wherein the junction of the wires presents an equal, if not a greater, resistance to strains tending to part the same.

To this and other ends my invention consists in a securing means for rubber vehicle-tires possessing the peculiarities of construction hereinafter described, and more particularly pointed out in the claims.

In the accompanying drawings, Figure 1 is a central longitudinal vertical section through a portion of a wheel-rim, showing my invention in its preferred form applied thereto. Fig. 2 is a top sectional plan view on the line 2 2 of Fig. 1. Fig. 3 is a bottom plan view of that portion of the rubber tire shown in Fig. 1, illustrating the means for effecting a junction of the meeting ends of the tire under the wire-fastening device. Fig. 4 is a side elevation of the rim and tire portions of a vehicle-wheel, showing my invention applied thereto; and Fig. 5 is a transverse sectional view through the rim of the tire on the line 5 5 of Fig. 1.

In the drawings, 6 designates the usual wooden rim of a vehicle-wheel, upon the outer periphery of which is seated the metal channel 7.

8 designates the rubber tire proper, which is in the usual substantially semi-oval cross-sectional form illustrated in Fig. 5. This rubber tire may be in a single length sufficient to extend entirely around the periphery of the rim or it may and preferably will be formed in two halves, as illustrated in Fig. 4, thereby providing two diametrically opposite points of junction. Embedded within the rubber tire 8 are the usual retaining-wires 9. In the constructions as now in common use these retaining-wires are made of a length sufficient to extend entirely around the periphery of the wheel with a slight excess to form overlapping ends, which are brazed or soldered together substantially in the line of junction of the rubber body of the tire, the two meeting ends of the latter being forced back a few inches to expose the ends of the wire for the fastening operation, after which the longitudinal expansion of the rubber causes the two ends of the tire to again meet in a close joint over the connected ends of the retaining-wires. The wires thus united constitute endless cords tending to bind the base of the tire to its seat in the channel against any lateral or radial force tending to unseat the same; but owing to the fact that the wires have no connection other than their frictional connection with the tire itself in which they are embedded tending to prevent longitudinal movement thereof relatively to the tire when the wheel is subjected to the traction effect of a motor tending to turn the same in contact with a fixed plane the natural elasticity of the tire-body, as hereinabove explained, sets up a creeping effect of the tire and the wires around the rim in opposite directions, with the injurious results above referred to.

In carrying out my invention I form the retaining-wires of a length slightly less than the length of the tire itself, and at the point of junction of the two ends of the tire I provide on the base of the channel a connection-piece, (designated as an entirety by 10.) This connection-piece comprises a metal strip which is preferably curved to conform to the curve of the rim and which is provided centrally and on the under side thereof with a boss 11, a countersunk hole being formed through the connection-piece and boss centrally thereof, which hole is adapted to register with a hole formed transversely through the channel and the rim for the reception of a securing-bolt 12. This bolt has at its upper end a conical head 13, fitted to seat in the countersunk upper end of the hole formed through the connection-piece 10 and its boss, and a nut 14, screwing over its projecting inner end against a curved cleat 15, whereby the connection-piece is firmly secured in the rim. Each end of the connection-piece has formed integral therewith a pair of shoulders 16, disposed, respectively, on opposite sides or edges of the connection-piece and in line with the respective paths of the retaining-wires in the tube-body. Over these shoulders 16 the opposing ends of each retaining-wire are bent up and anchored in the manner plainly shown in Fig. 1. As an additional means for securing the connection-piece 10 rigidly to and in true longitudinal alinement with the center of the rim-channel I preferably pass through the rim and channel on either side of the central bolt 12 machine-bolts 17, the heads 18 of which abut the cleat 15, while their upper ends screw into the ends of connection-piece 10 and draw the latter into snug clamping engagement with the underlying tire-base.

In order to permit the meeting ends of the tire-body to come together over the connection-piece 10 and its securing-bolts, as well as over the outwardly-bent and anchored ends of the retaining-wires, it is necessary to socket the meeting ends of the tire-body for a distance aggregating the length of the connection-piece and to an extent sufficient to admit the said connection-piece and its appurtenances within the body of the tire. Such a socket is herein shown at 19. In order that the ends of the tire-body may come into conjunction over the projecting outer ends of the side bolts 17, the base of the tire-body is provided for a short distance inwardly from each end thereof with a longitudinal slot, (indicated at 20 in Fig. 3,) which slot communicates with the socket or recess 19, the slot in each end of the tire-body being laterally enlarged at its open end, as shown at 21, in order to permit the ends of the base of the tube to meet over and around the boss 11 of the connection-piece.

The parts are assembled and the tire applied in the following manner: The connection-piece 10 is first applied to the bottom of the channel by means of its securing-bolts 12 and 17, occupying the relative position therein clearly shown in Figs. 1, 2, and 5. The rubber tire-body having the retaining-wires embedded therein is next applied to the channel of the rim, being initially secured in proper position therein by temporary external retaining devices. The retaining-wires 9, as above explained, are of such a length that they fall somewhat short of the meeting ends of the tire. In the operation of first placing the tire in the channel the ends of the tire-body may meet over the center of the connection-piece by virtue of the sockets 19 and slots 20 and 21 therein, which afford a space within the tire-body for the reception of the connection-piece and its appurtenances. The tire-body having thus been properly positioned relatively to its containing-channel and temporarily held therein by external devices, the two meeting ends of the tire-body are next forced or shrunk back away from each other over and past the two longitudinal halves of the connection-piece, which they respectively cover, thus exposing the connection-piece and the ends of the retaining-wires which lie directly beneath their respective shoulders on the connection-piece. With a pair of pliers or any other suitable tool the projecting ends of the retaining-wires are quickly bent upwardly and backwardly over their respective shoulders on the connection-piece, whereby said wires at once become securely anchored to said connection-piece by virtue of the longitudinal tension to which they are subjected. The wires having been thus anchored to the connection-piece, the two meeting faces of the tire-body may be treated with cement, after which the ends of the tire-body are allowed, by reason of the natural expansibility of the rubber, to expand and meet over the connection-piece, thus entirely concealing and protecting the latter.

It will be evident that inasmuch as the connection-piece is securely bolted to the channel and felly of the wheel, while the retaining-wires are anchored at their ends to said connection-piece, all possibility of relative longitudinal movement between the retaining-wires and the rim is done away with, and it will be equally obvious that the presence of the connection-piece embedded within a socketed portion of the tire-body renders impossible any longitudinal creeping of the tire-body upon the rim. My improvements thus insure that the tire-body, channel-rim, retaining-wires, and wheel-rim shall always be maintained relatively stationary. This virtually obviates all tendency on the part of the retaining-wires to cut through the rubber or fabric base of the tire-body and greatly prolongs the life of a tire which employs the longitudinal wires as a securing device.

I claim—

1. The combination with a channel-rim and a rubber tire-body seated therein and having its meeting ends longitudinally socketed, of fastening means for securely uniting said meeting ends of the tire-body, comprising a connection-strip secured centrally to, and disposed parallel with and slightly above, the base of the channel longitudinally thereof, said connection-strip being housed within the socketed meeting end portions of the tire-body, and means serving to unite the extremities of the connection-strip with the base of the channel and thereby clamp the base portion of the tire-body to the base of the channel beneath said connection-strip, substantially as described.

2. The combination with a channel-rim and a rubber tire-body seated therein and having its meeting ends longitudinally socketed, of fastening means for securely uniting said meeting ends of the tire-body, comprising a connection-strip secured centrally to, and disposed parallel with and slightly above, the base of the channel longitudinally thereof, said connection-strip being housed within the socketed meeting end portions of the tire-body, and bolts passing through the felly of the wheel and the extremities of said connection-strip and thereby serving to clamp the base portion of the tire-body to the base of the channel, and thus prevent separation of the meeting ends of the tire-body at the joint, substantially as described.

3. The combination with a channel-rim and a rubber tire-body seated therein and having its meeting ends longitudinally socketed, of means for securing said tire-body to its seat and likewise prevent creeping thereof and separation of the meeting ends, comprising a connection-strip secured centrally to, and disposed parallel with and slightly above, the base of the channel longitudinally thereof, said connection-strip being housed within the socketed meeting end portions of the tire-body, one or more fastening-wires embedded in said tire-body, the meeting ends of which are anchored to the extremities of said connection-strip, and bolts passing through the felly of the wheel and secured to the extremities of said connection-strip, said bolts serving to clamp the base portion of the tire-body to the base of the channel and thus preserve a closed joint at the meeting ends of the tire-body, substantially as described.

FRANK P. STONE.

Witnesses:
W. S. REED,
J. W. RICHARDSON.